(12) United States Patent
Lin

(10) Patent No.: US 8,141,893 B2
(45) Date of Patent: Mar. 27, 2012

(54) FOLDING APPARATUS FOR A BICYCLE FRAME

(76) Inventor: Wen Teng Lin, Taichung County (TW)

( * ) Notice: Subject to any disclaimer, the term of this patent is extended or adjusted under 35 U.S.C. 154(b) by 287 days.

(21) Appl. No.: 12/684,975

(22) Filed: Jan. 11, 2010

(65) Prior Publication Data

US 2011/0169246 A1 Jul. 14, 2011

(51) Int. Cl.
*B62K 15/00* (2006.01)
(52) U.S. Cl. .......................................... 280/278; 280/287
(58) Field of Classification Search .................. 280/278, 280/287
See application file for complete search history.

(56) References Cited

U.S. PATENT DOCUMENTS

| 4,579,360 | A | * | 4/1986 | Nishimura et al. | 280/278 |
| 5,431,507 | A | * | 7/1995 | Smilanick | 403/307 |
| 5,975,551 | A | * | 11/1999 | Montague et al. | 280/287 |
| 2002/0167151 | A1 | * | 11/2002 | Tseng | 280/287 |

* cited by examiner

*Primary Examiner* — Kevin Hurley

(57) ABSTRACT

A folding apparatus for a bicycle frame includes a bicycle frame and at least one engaging device assembled on the bicycle frame. The bicycle frame includes at least one first tube and at least one second tube. Each of the at least one engaging device includes a stationary sleeve disposed on the second tube and has a series of second tooth formed thereon. A rotary sleeve is fixed to the first tube and rotatably mounted on the second tube. The rotary sleeve has a series of first tooth formed thereon for correspondingly engaging with the stationary sleeve. A locking device is movably mounted on the second tube for securely retaining the rotary sleeve firmly engaging with the stationary sleeve. When the locking device is released, the rotary sleeve and the first tube rotate relative to the second tube, and the bicycle frame is folded.

8 Claims, 5 Drawing Sheets

FOLDING APPARATUS FOR A BICYCLE FRAME

BACKGROUND OF THE INVENTION

1. Field of the Invention

The present invention relates to a folding apparatus for a bicycle frame, and more particularly to a folding apparatus for quickly folding the bicycle frame.

2. Description of Related Art

A conventional folding frame for bicycles in accordance with the prior art comprises an upper horizontal rod and a lower rod extending from a support of a pedal shaft upwardly and forwardly to the upper rod. Each of the upper and the lower rods is composed of two separate sections formed thereon. The two separate sections have a pivotal connection by a universal coupling device. The coupling device consists of two separate parts respectively connected to the two separate sections. One separate part has a first cylindrical head formed thereon and the first cylindrical head has a shaft laterally extending therefrom. The other separate part has a H-shaped jaw having two second cylindrical heads parallely formed thereon. The first cylindrical head is received between the two second cylindrical heads and pivotally rotates about the shaft. Accordingly, a front portion and a rear portion of the frame are folded together when the two coupling devices revolve around the shaft.

However, the coupling devices are assembled on the upper and lower rods respectively. This may weaken a structure of the upper and lower rods. And the two coupling devices are not locked or fastened when the frame is unfolded. It is unsafe that the two rods may be folded unexpectedly when a rider is riding.

The present invention has arisen to mitigate and/or obviate the disadvantages of the conventional folding frame for bicycles.

SUMMARY OF THE INVENTION

The main objective of the present invention is to provide an improved folding apparatus for a bicycle.

To achieve the objective, the folding apparatus for a bicycle in accordance with the present invention includes a bicycle frame and at least one engaging device assembled on the bicycle frame. The bicycle frame includes at least one first tube and at least one second tube connected to the at least one first tube. Each of the at least one engaging device comprises a stationary sleeve disposed on the second tube of the bicycle frame. The stationary sleeve has a series of second tooth annularly formed thereon and extending downwardly therefrom. A rotary sleeve is fixed to the first tube of the bicycle frame. The rotary sleeve is pivotally rotatably mounted on the second tube and located below the stationary sleeve. The rotary sleeve has a series of first tooth annularly formed thereon and extending upwardly therefrom for correspondingly engaging with the second tooth on the stationary sleeve. Each tooth of the first teeth and the second teeth is wedge-shaped. A locking device is movably mounted on the second tube and located below the rotary sleeve for securely retaining the rotary sleeve firmly engaging with the stationary sleeve.

In accordance with a preferred aspect of the present invention, the at least one engaging device is two engaging devices. The at least one first tube is a top tube and a down tube. The at least one second tube is a seat tube. The two rotary sleeves are respectively fixed to the top tube and the down tube of the bicycle frame. The two stationary sleeves are disposed on the seat tube of the bicycle frame and respectively correspond to the two rotary sleeves for engaging with the two rotary sleeves. The locking device has a ring and a quick release for securely retaining the rotary sleeve engaging with the stationary sleeve.

Correspondingly, when the locking device is released and the rotary sleeve moves downwardly to disengage with the stationary sleeve, the top tube and the down tube pivotally simultaneously rotate with the two rotary sleeves relative to the seat tube, such that the bicycle frame is folded.

In accordance with a second aspect of the present invention, the at least one engaging device is two engaging devices. The at least one first tube is the top tube and the down tube. The at least one second tube is the seat tube including an upper portion and a lower portion formed thereon. The two rotary sleeves are respectively fixed to the top tube and the down tube of the bicycle frame. One stationary sleeve is disposed on the upper portion of the seat tube and located above a five-way pipe of the bicycle frame. The other stationary sleeve is disposed on the lower portion of the seat tube and located below the five-way pipe. The stationary sleeve on the upper portion corresponds to the rotary sleeve on the top tube. The stationary sleeve on the lower portion corresponds to the rotary sleeve on the down tube.

Correspondingly, when the locking device is released and the rotary sleeve moves downwardly to disengage with the stationary sleeve, the top tube and the down tube simultaneously pivotally rotate with the two rotary sleeves relative to the seat tube, such that the bicycle frame is folded.

In accordance with a third aspect of the present invention, the locking device is a bundling ring mounted on the second tube. The bundling ring is located at a section of the second tube and has a tapered inner periphery. The section has a tapered outer periphery corresponding to the tapered inner periphery of the bundling ring, such that the bundling ring tends to push the rotary sleeve toward the stationary sleeve and the rotary sleeve firmly engages with the stationary sleeve.

In accordance with a fourth aspect of the present invention, the locking device is a bundling ring mounted on the second tube. The bundling ring is located at a section of the second tube and has a threaded inner periphery. The section has a threaded outer periphery corresponding to the threaded inner periphery of the bundling ring, such that the bundling ring engages with the section of the second tube and rotates upwardly for pushing the rotary sleeve toward the stationary sleeve, such that the rotary sleeve firmly engages with the stationary sleeve.

Further benefits and advantages of the present invention will become apparent after a careful reading of the detailed description with appropriate reference to the accompanying drawings.

DETAILED DESCRIPTION OF THE INVENTION

Figure 1:
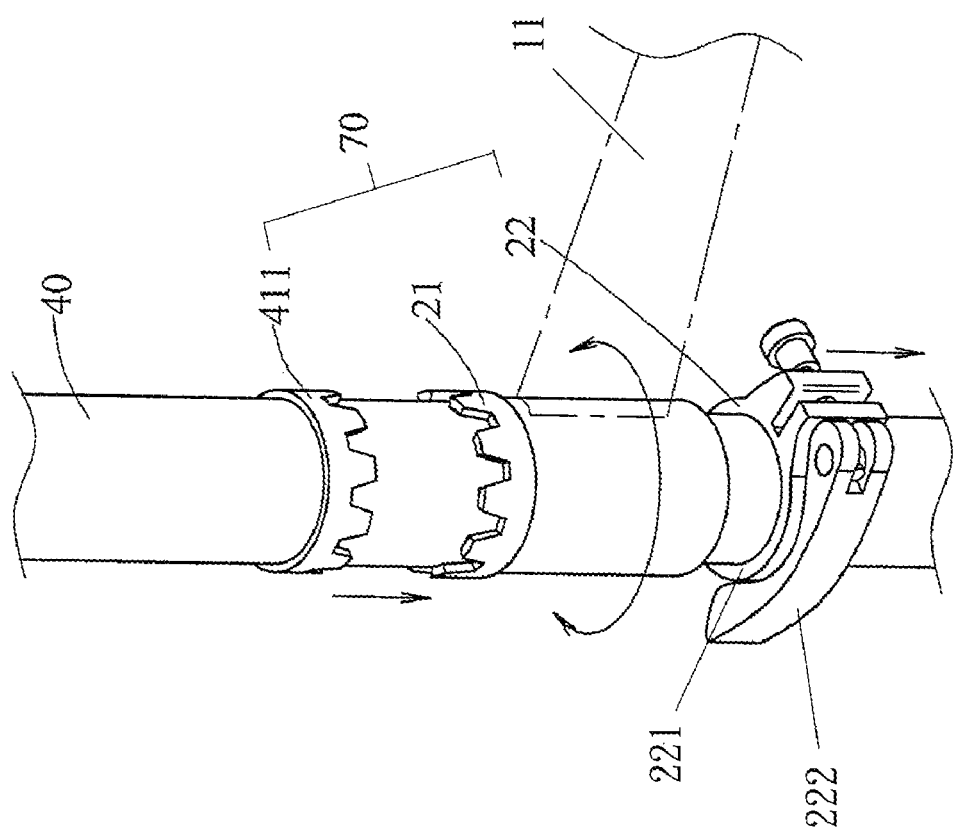
FIG. 1 is a perspective view of an engaging device of a folding apparatus for a bicycle frame in accordance with the present invention.
Figure 2:
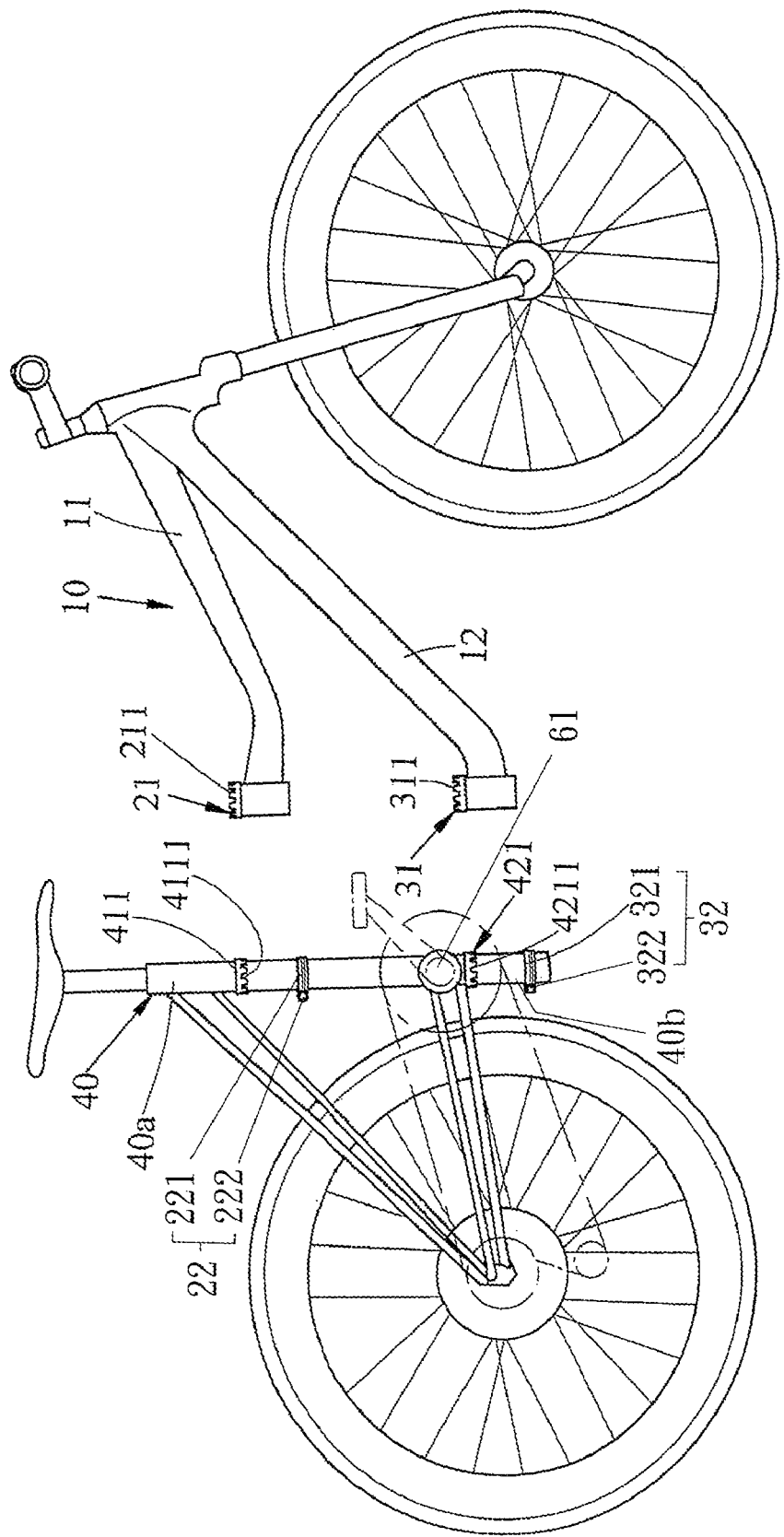
FIGS. 2-3 are side views of the preferred embodiment of the folding apparatus for a bicycle frame in accordance with the present invention as the two engaging devices are assembled on a bicycle frame.
Figure 3:
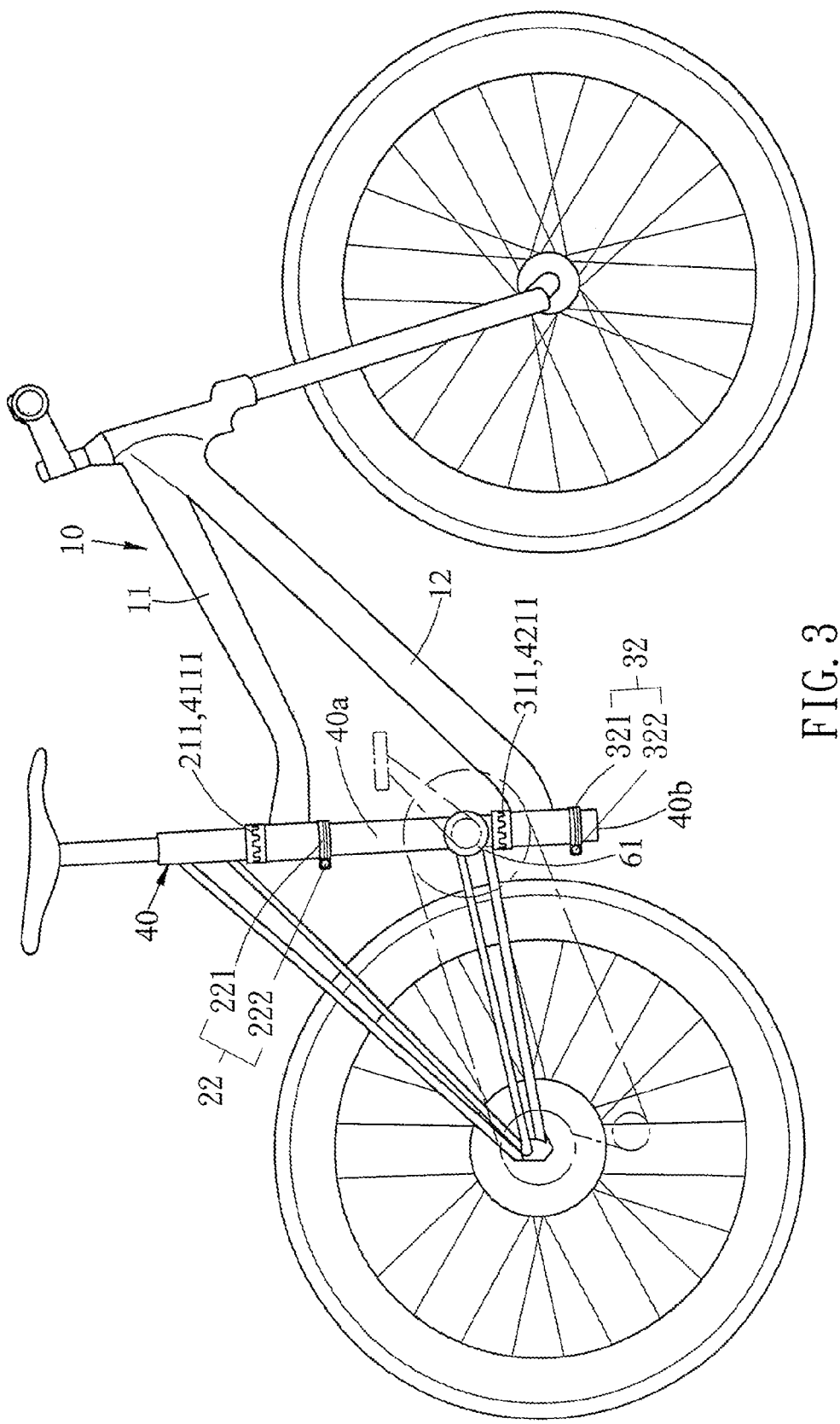

Referring to the drawings and initially to FIGS. 1-3, a folding apparatus for a bicycle frame in accordance with the present invention comprises a bicycle frame 10 and at least one engaging device 70 assembled on the bicycle frame 10. The bicycle frame 10 includes at least one first tube 11 and at least one second tube 40 connected to the at least one first tube 11. Each engaging device 70 comprises a stationary sleeve 411 sleeving on the second tube 40 of the bicycle frame 10. The stationary sleeve 411 has a series of second tooth 4111 annularly formed thereon and extending downwardly therefrom. A rotary sleeve 21 is fixed to one end of the first tube 11 of the bicycle frame 10. The rotary sleeve 21 pivotally rotatably sleeves on the second tube 40 and is located below the stationary sleeve 411. The rotary sleeve 21 has a series of first tooth 211 annularly formed thereon and extending upwardly therefrom for correspondingly engaging with the second tooth 4111 on the stationary sleeve 411. Each tooth of the first teeth 211 and the second teeth 4111 is wedge-shaped. A locking device 22 is adjustably mounted on the second tube 40 and located below the rotary sleeve 21 for securely retaining the rotary sleeve 21 firmly engaging with the stationary sleeve 411.

In the preferred embodiment, the bicycle frame 10 has two engaging devices 70. The at least one first tube is a top tube 11 and a down tube 12. The at least one second tube is a seat tube 40. The two rotary sleeves 21, 31 are respectively fixed to one end of the top tube 11 and one end of the down tube 12 of the bicycle frame 10. The two stationary sleeves 411, 421 sleeve on the seat tube 40 and respectively corresponding to the two rotary sleeves 21, 31 for engaging with the two rotary sleeves 21, 31.

Each locking device 22, 32 includes a ring 221, 321 movably mounted on the seat tube 40 and a quick release 222, 322 movably connected to the ring 221, 321 for quickly tightening/releasing the ring 221, 321. The two rings 221, 321 sleeve on the seat tube 40 and is respectively located below the two rotary sleeves 21, 31.

Accordingly, as shown in FIG. 3, the two rotary sleeves 21, 31 respectively engage with the two stationary sleeves 411, 421. The two quick releases 222, 322 tighten the two rings 221, 321 on the seat tube 40 for securely retaining the two rotary sleeves 21, 31 engaging with the two stationary sleeves 411, 421, such that the bicycle frame 10 is kept unfolded.

Figure 4:
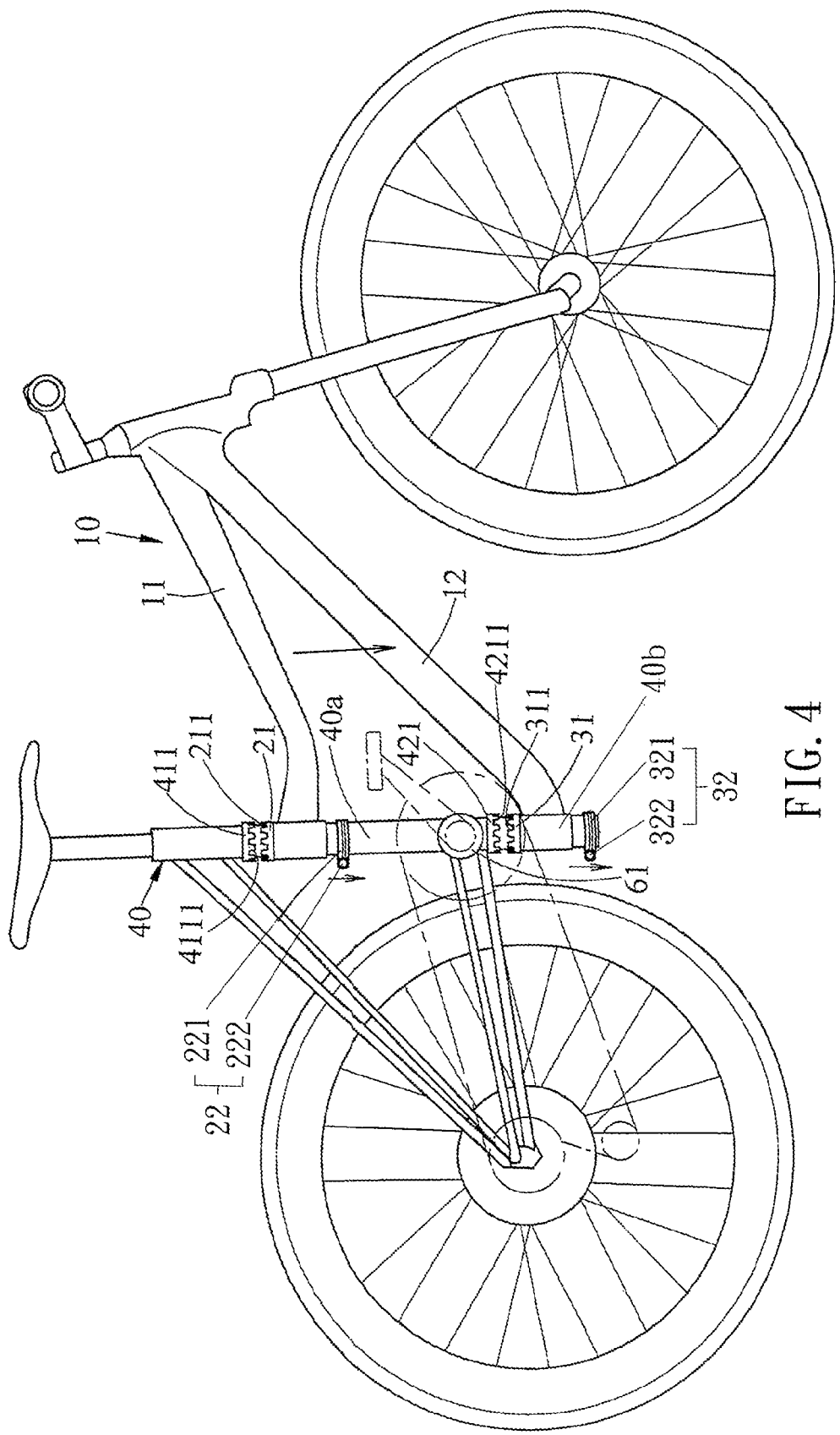
FIGS. 4-5 are operational side views of the preferred embodiment of the folding apparatus for a bicycle frame in accordance with the present invention as the bicycle frame is folded.
Figure 5:
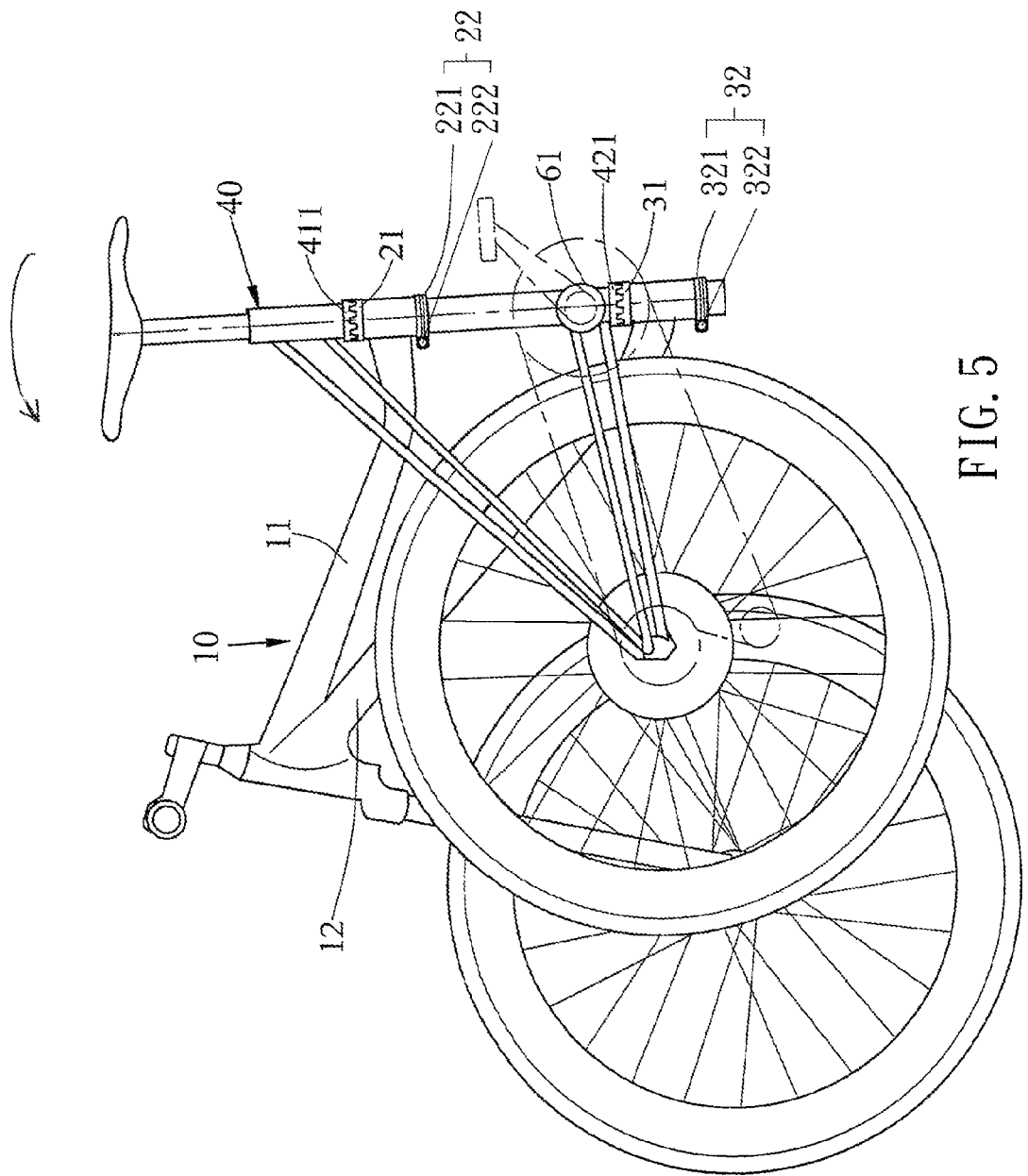

As shown in FIGS. 4-5, when the two rings 221, 321 are released by loosing the two quick releases 222, 322, the two rotary sleeves 21, 31 move downwardly to disengage with the two stationary sleeves 411, 421. The top tube 11 and the down tube 12 pivotally simultaneously rotate with the two rotary sleeves 21, 31 relative to the seat tube 40, such that the top tube 11 and the down tube 12 are rotates from a front of the seat tube 40 to a rear of the seat tube 40, and the bicycle frame 10 is folded.

With reference to FIG. 2-5, that shows a second embodiment of the folding apparatus for a bicycle frame in accordance with the present invention. The elements and effects of the second embodiment which are the same with the first embodiment are not described, only the differences are described. In this embodiment, the at least one first tube is the top tube 11 and the down tube 12. The at least one second tube is the seat tube 40 including an upper portion 40*a* and a lower portion 40*b* formed thereon. The two rotary sleeves 21, 31 are respectively fixed to the top tube 11 and the down tube 12 of the bicycle frame 10. One stationary sleeve 411 sleeves on the upper portion 40*a* of the seat tube 40 and is located above a five-way pipe 61 of the bicycle frame 10. The other stationary sleeve 421 sleeves on the lower portion 40*b* of the seat tube 40 and is located below the five-way pipe 61. The stationary sleeve 411 on the upper portion 40*a* corresponds to the rotary sleeve 21 on the top tube 11. The stationary sleeve 421 on the lower portion 40*b* corresponds to the rotary sleeve 31 on the down tube 12.

Accordingly, when the two locking devices 22, 32 are released and the two rotary sleeves 21, 31 move downwardly to disengage with the two stationary sleeves 411, 421, the top tube 11 and the down tube 12 simultaneously pivotally rotate with the two rotary sleeves 21, 31 relative to the seat tube 40, such that the bicycle frame 10 is folded.

Moreover, a third embodiment of the folding apparatus for a bicycle frame in accordance with the present invention is as follows. The elements and effects of the third embodiment which are the same with the first embodiment are not described, only the differences are described. In this embodiment, each locking device 22, 32 is a bundling ring (not shown) mounted on the second tube 40. The bundling ring is located at a section of the second tube 40 and has a tapered inner periphery. The section of the second tube 40 has a tapered outer periphery corresponding to the tapered inner periphery of the bundling ring, such that the bundling ring tends to push the corresponding rotary sleeve 21, 31 toward the stationary sleeve 411, 421. Correspondingly, the rotary sleeve 21, 31 firmly engages with the stationary sleeve 411, 421.

A fourth embodiment of the folding apparatus for a bicycle frame in accordance with the present invention is as follows. The elements and effects of the fourth embodiment which are the same with the first embodiment are not described, only the differences are described. In this embodiment, each locking device 22, 32 is a bundling ring (not shown) mounted on the second tube 40. The bundling ring is located at a section of the second tube 40 and has a threaded inner periphery. The section of the second tube 40 has a threaded outer periphery corresponding to the threaded inner periphery of the bundling ring, such that the bundling ring engages with the section of the second tube 40 and rotates upwardly for pushing the corresponding rotary sleeve 21, 31 toward the stationary sleeve 411, 421. In accordance, the rotary sleeve 21, 31 firmly engages with the stationary sleeve 411, 421.

Although the invention has been explained in relation to its preferred embodiment, it is to be understood that many other possible modifications and variations can be made without departing from the spirit and scope of the invention as hereinafter claimed.

What is claimed is:

1. A folding apparatus for a bicycle frame comprising:
    a bicycle frame, at least one engaging device assembled on the bicycle frame, the bicycle frame including at least one first tube and at least one second tube connected to the at least one first tube, each of the at least one engaging device comprising:
    a stationary sleeve disposed on the second tube of the bicycle frame, the stationary sleeve having a series of second tooth annularly formed thereon and extending downwardly therefrom;
    a rotary sleeve fixed to the first tube of the bicycle frame, the rotary sleeve pivotally rotatably mounted on the second tube and located below the stationary sleeve, the rotary sleeve having a series of first tooth annularly formed thereon and extending upwardly therefrom for correspondingly engaging with the second tooth on the stationary sleeve; and
    a locking device movably mounted on the second tube and located below the rotary sleeve for securely retaining the rotary sleeve firmly engaging with the stationary sleeve;

wherein when the locking device is released and the rotary sleeve moves downwardly to disengage with the stationary sleeve, the rotary sleeve and the first tube are able to pivotally rotate relative to the second tube such that the bicycle frame is folded.

2. The folding apparatus for a bicycle frame as claimed in claim 1, wherein the at least one engaging device is two engaging devices, the at least one first tube being a top tube and a down tube, the at least one second tube being a seat tube, the two rotary sleeves respectively fixed to the top tube and the down tube of the bicycle frame, the two stationary sleeves disposed on the seat tube of the bicycle frame and respectively corresponding to the two rotary sleeves for engaging with the two rotary sleeves;

wherein when the locking device is released and the rotary sleeve moves downwardly to disengage with the stationary sleeve, the top tube and the down tube pivotally simultaneously rotate with the two rotary sleeves relative to the seat tube, and the bicycle frame is folded.

3. The folding apparatus for a bicycle frame as claimed in claim 1, wherein the locking device has a bundling ring mounted on the second tube for securely retaining the rotary sleeve engaging with the stationary sleeve.

4. The folding apparatus for a bicycle frame as claimed in claim 1, wherein the locking device has a ring mounted on the second tube and a quick release mounted on the ring for securely retaining the rotary sleeve engaging with the stationary sleeve.

5. The folding apparatus for a bicycle frame as claimed in claim 1, wherein each tooth of the first teeth and the second teeth is wedge-shaped.

6. The folding apparatus for a bicycle frame as claimed in claim 1, wherein the at least one engaging device is two engaging devices, the at least one first tube being a top tube and a down tube, the at least one second tube being a seat tube including an upper portion and a lower portion formed thereon, the two rotary sleeves respectively fixed to the top tube and the down tube of the bicycle frame, one stationary sleeve disposed on the upper portion of the seat tube and located above a five-way pipe of the bicycle frame, the other stationary sleeve disposed on the lower portion of the seat tube and located below the five-way pipe, the stationary sleeve on the upper portion corresponding to the rotary sleeve on the top tube, the stationary sleeve on the lower portion corresponding to the rotary sleeve on the down tube;

wherein when the locking device is released and the rotary sleeve moves downwardly to disengage with the stationary sleeve, the top tube and the down tube simultaneously pivotally rotate with the two rotary sleeves relative to the seat tube, and the bicycle frame is folded.

7. The folding apparatus for a bicycle frame as claimed in claim 3, wherein the bundling ring is located at a section of the second tube and has a tapered inner periphery, the section having a tapered outer periphery corresponding to the tapered inner periphery of the bundling ring, such that the bundling ring tends to push the rotary sleeve toward the stationary sleeve and the rotary sleeve firmly engages with the stationary sleeve.

8. The folding apparatus for a bicycle frame as claimed in claim 3, wherein the bundling ring is located at a section of the second tube and has a threaded inner periphery, the section having a threaded outer periphery corresponding to the threaded inner periphery of the bundling ring, such that the bundling ring engages with the section of the second tube and rotates upwardly for pushing the rotary sleeve toward the stationary sleeve, and the rotary sleeve firmly engages with the stationary sleeve.

\* \* \* \* \*